United States Patent
Quinn et al.

(10) Patent No.: US 9,425,973 B2
(45) Date of Patent: Aug. 23, 2016

(54) RESOURCE-BASED SYNCHRONIZATION BETWEEN ENDPOINTS IN A WEB-BASED REAL TIME COLLABORATION

(75) Inventors: William M. Quinn, Lexington, KY (US); Ron E. Pontrich, Lexington, KY (US); Ramya Sethuraman, Lexington, KY (US); Christopher D. Price, Georgetown, KY (US); Christopher A. Hyland, Foxboro, MA (US); Aseel Aziz-Gomez, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 11/616,175

(22) Filed: Dec. 26, 2006

(65) Prior Publication Data

US 2008/0155104 A1  Jun. 26, 2008

(51) Int. Cl.
*G06F 15/16* (2006.01)
*H04L 12/18* (2006.01)
*H04L 29/08* (2006.01)

(52) U.S. Cl.
CPC .......... *H04L 12/1827* (2013.01); *H04L 67/02* (2013.01)

(58) Field of Classification Search
CPC ............. G06Q 20/401; G06Q 20/405; G06Q 30/0255; G06Q 50/01; H04W 4/028; H04L 67/02; H04L 67/22; H04L 67/141; H04L 67/142
USPC ....... 709/204, 205, 206, 207, 227, 228, 229, 709/248, 250; 715/762
See application file for complete search history.

(56) References Cited

U.S. PATENT DOCUMENTS 6,233,600 B1  5/2001 Salas et al.
6,484,196 B1  11/2002 Maurille (Continued)

OTHER PUBLICATIONS http://en.wikipedia.org/wiki/List_of_colaborative_software.

(Continued)

*Primary Examiner* — Waseem Ashraf
*Assistant Examiner* — Farrukh Hussain
(74) *Attorney, Agent, or Firm* — BainwoodHuang (57) ABSTRACT

A system for providing resource-based synchronization between clients in a Web-based real-time collaboration, in which a session front end on the server layers a transaction history on top of all session resources. HTTP operations are issued by client systems to request changes to session resources and to request session updates. The HTTP resource change requests include hierarchical pointers containing session identifiers and resource identifiers within a URL. The client generated resource change request operations may be HTTP PUT, HTTP DELETE, and HTTP POST commands. The HTTP session update request operations may be HTTP GET commands. A session front end stores each received resource change request operation in a resource-specific transaction history of change request operations received from all client systems. The session front end maintains a current session state indicating the number of resource change request operations stored for each session resource. A last session state for each client system indicates the number of change request operations that client system has previously received for each session resource. For a session update, the session front end compares the last client session state for the requesting client with the current session state and determines the change request operations that need to be forwarded to the requesting client system to bring it up to date. The session front end removes negating change request operations from the change request operations forwarded to the requesting client system.

16 Claims, 3 Drawing Sheets

(56) References Cited

U.S. PATENT DOCUMENTS

| | | | |
|---|---|---|---|
| 6,898,642 B2* | 5/2005 | Chafle et al. | 709/248 |
| 6,993,537 B2 | 1/2006 | Buxton | |
| 2002/0042830 A1 | 4/2002 | Bose et al. | |
| 2002/0065912 A1* | 5/2002 | Catchpole et al. | 709/224 |
| 2002/0078150 A1 | 6/2002 | Thompson et al. | |
| 2003/0101223 A1 | 5/2003 | Pace et al. | |
| 2004/0107256 A1 | 6/2004 | Odenwald et al. | |
| 2004/0117358 A1 | 6/2004 | von Kaenel et al. | |
| 2005/0002514 A1* | 1/2005 | Shafiee et al. | 379/265.09 |
| 2005/0010454 A1 | 1/2005 | Falk et al. | |
| 2005/0114527 A1 | 5/2005 | Hankey et al. | |
| 2005/0138122 A1* | 6/2005 | Boehringer et al. | 709/205 |
| 2006/0026502 A1 | 2/2006 | Dutta | |
| 2006/0075121 A1 | 4/2006 | Ludwig et al. | |
| 2006/0101139 A1 | 5/2006 | Hornreich et al. | |
| 2006/0167662 A1* | 7/2006 | Yu et al. | 702/186 |
| 2007/0100952 A1* | 5/2007 | Chen et al. | 709/207 |
| 2008/0086564 A1* | 4/2008 | Putman | H04L 29/06 709/227 |

OTHER PUBLICATIONS http://www.webex.com/.
http://www.microsoft.com/uc/livemeeting/default.mspx.
http://www.microsoft.com/windows/netmeeting/.
http://www.microsoft.com/office/communicator/webaccess/prodinfo/default.mspx.

* cited by examiner

RESOURCE-BASED SYNCHRONIZATION BETWEEN ENDPOINTS IN A WEB-BASED REAL TIME COLLABORATION

FIELD OF THE INVENTION

The present invention relates generally to software collaboration systems, and more specifically to a method and system for providing resource-based synchronization between end points in a Web-based real-time collaboration.

BACKGROUND OF THE INVENTION

Web-based Real-Time Collaboration (RTC) allows the content of a session (e.g. an on-line meeting or the like) to be synchronized in real-time among all client systems ("end points") participating in the same session. In the area of Web applications, Web-conferences or on-line meetings present unique challenges, since HTTP (HyperText Transfer Protocol) alone does not provide a way to synchronize data among remote users connected to the same server. As a result, it is problematic to create a Web-based e-meeting application, without using requiring installation of additional technology into the Web browser program running on the end points (client systems). Requiring add-on technologies such as Java™ and ActiveX® tends to create complexities and unfamiliar barriers for users to deal with. There is therefore a need for a Web-based RTC application that does not require such Web browser add-ons.

Although HTTP is the language of the Web browser, and can be invoked using technology common to most browsers (e.g. HTML, XML, JavaScript), existing systems have not provided simple JavaScript-based RTC solutions. One possible RTC Web solution would involve end points sending messages wrapped in HTTP to a server system, while also periodically polling the server via HTTP to scan for new messages to be similarly received. Such an approach based on HTTP wrapped messages is sometimes referred to as HTTP "tunneling." Using this type of approach, the flow of messages between end points would provide a way for all end points to stay synchronized. However, the code required to create, parse and interpret the messages typically require more than can be provided conveniently using JavaScript. There accordingly a need for a different solution that is simple enough that it can be advantageously implemented using JavaScript.

Message-based RTC systems are burdened with making sure each message is received by each end point. When an end point is disconnected, or polls too slowly, memory used to queue messages may become backed-up in the server and potentially also in the end points. To address this problem, certain defense mechanisms may be used to time-out and disconnect users. However, with the wide-spread adoption of mobile computing and communication technology, it is common for a user to experience network service drop-outs. As a result, in some cases, such time out and disconnection based defense mechanisms may be too rigid, and may operate to disconnect valid users, causing user dissatisfaction. There is accordingly a need for a solution that is relatively forgiving of user disconnects, since they are a common experience.

In many use cases, sequential messages in an e-meeting negate one another (e.g. the slide show command sequence "goToPage-5", "goToPage-4", "goToPage-5"). In such scenarios, regardless of the implementation, it would be more efficient to avoid sending all of the message data to all endpoints, and instead only send what is specifically needed by each endpoint. There is accordingly a need to communicate via HTTP, but without forcing the endpoints to receive redundant data.

Moreover, it is important to keep in mind the general nature of real-world applications. A desirable system should support many users who may randomly join, leave, or get disconnected from a session, at any given time. There is accordingly a need for a logical mechanism to organize the HTTP-based communication, taking into account the unique situation of each client.

For the above reasons it would be desirable to have a new system for providing Web-based real-time collaboration.

SUMMARY OF THE INVENTION

To address the above described and other shortcomings of previous solutions, a method and system for providing resource-based synchronization between clients in a Web-based real-time collaboration are disclosed. In the disclosed system, a session front end is provided on the server that layers a transaction history on top of all session resources. HTTP operations are issued by the client systems to the session front end in the server to request changes to session resources and to request session updates regarding the current state of session resources. The client generated HTTP resource change request operations include hierarchical pointers to data structures storing transaction histories for corresponding session resources. The hierarchical pointers in the HTTP change request operations include session identifiers and resource identifiers, for example within a URL (Uniform Resource Locator) contained in the HTTP operations. In one embodiment, the client generated resource change request operations are implemented as HTTP PUT commands for additions to specified session resources, HTTP DELETE commands for deletions to specified session resources, and HTTP POST commands for edit to specified session resources. Further in one embodiment of the disclosed system, the end point generated HTTP session update request operations are implemented as HTTP GET commands.

During a real-time collaboration session, the session front end on the server system stores each received client generated resource change request operation in the resource transaction history indicated by the operation. Thus the resource transaction history for a session resource contains all resource change request operations received for that resource from all client systems during the session, and does not include session update request operations.

The session front end maintains a current session state across all session resources. The current session state indicates the number of resource change request operations received and stored for each session resource. In one embodiment, the session front end further includes a last client session state for each client system in the real time collaboration session. The last client session state for a given client system indicates the number of change request operations that client system has previously received from the session front end for each session resource. In an alternative embodiment, the last client session state for each client system is stored in the respective client system, and is provided to the session front end together with each session update request operation.

When a session update request operation is received from one of the client systems, the session front end operates to compare the last client session state for the requesting client with the current session state. Based on this comparison, for each resource, the session front end determines the change request operations that need to be forwarded to the requesting client system to bring it up to date. The session front end removes any negating change request operations from the change request operations to be forwarded to the requesting client system before sending the update response, thus preventing the waste of resources to update a client with change request operations for a resource that cancel each other out.

Thus there is disclosed a new system for providing Web-based real-time collaboration that significantly address many shortcomings of previous solutions.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
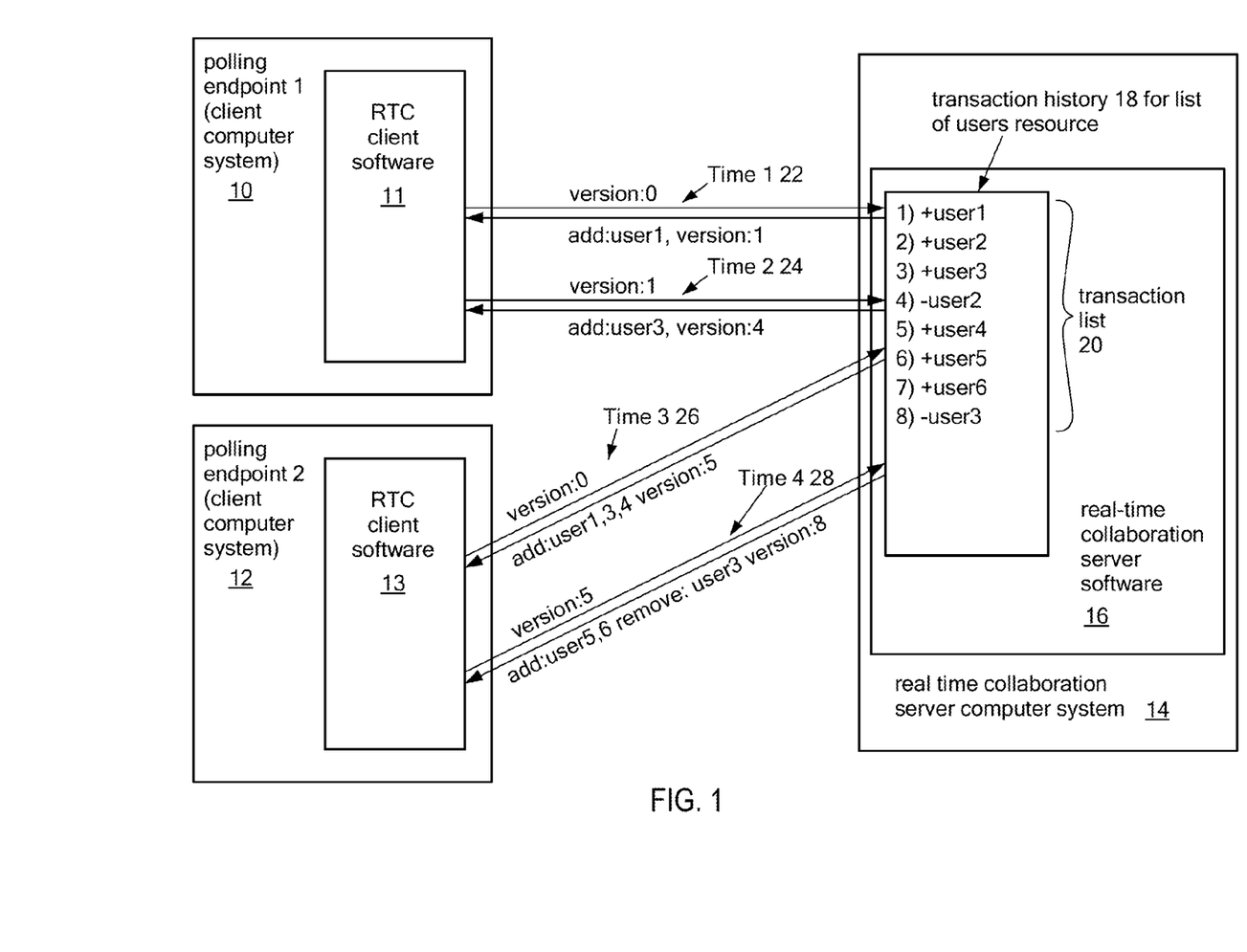
FIG. 1 is a block diagram showing structure and operation of an illustrative embodiment of the disclosed system.

FIG. 1 is a block diagram showing structure and operation of an illustrative embodiment of the disclosed system. As shown in FIG. 1, a polling end point 1 10 (e.g. client computer system or other client device) and polling end point 2 12 (e.g. client computer system or other client device) each include real time collaboration client software, shown as real time collaboration client software 11 in end point 1 10 and real time collaboration client software 13 in end point 2 12. A real time collaboration server computer system 14 is shown including real-time collaboration server software 16. The real-time collaboration server software 16 is shown including a transaction history 18 for a list of users resource shared among the participants of a real-time collaboration session. The end point 1 and end point 2 client computer systems provide the real-time collaboration session to their respective local users, for example by way of a graphical user interface or the like, and the local users of the polling end point 1 and polling end point 2 are thus participants in the real time collaboration session.

The real time collaboration session of FIG. 1 enables the session participants to share one or more resources during the real time collaboration session. The transaction history 18 is an example of a transaction history for a resource shared during the real time collaboration session. The resource represented by the transaction history 18 is a list of users that are participants in the real time collaboration session. For example, if the real time collaboration session were a group instant messaging ("chat") session or the like, then the user list resource represented by the transaction history 18 would contain a list of users that are currently participating in the group instant messaging session. The list of users that are currently participating in the group instant messaging session may, for example, be continuously provided as part of a real time collaboration session user interface to each participant in the real time collaboration session, while the real time collaboration session is underway. The list of users for the real time collaboration session may change dynamically during the session, as participants join and leave the session, and operation of the disclosed system in the example of FIG. 1 results in each participant being provided with an up to date view of the current session participants during the session.

A transaction list 20 contains the resource change operations performed by session participants on the resource represented by the transaction history 18. The transaction list 20 is a sequential record of resource change operations and the data that the operations have been performed on, maintained by the real-time collaboration server software 16. For example, when a user identified as "user1" is added to the user list represented by the transaction history 18, then the real-time collaboration server software 16 adds an entry to the transaction history 18 of "+user1". Thus in the embodiment shown in FIG. 1, the format of each operation stored in the transaction history 18 is <operation><data> where operations can be additions (+), subtractions (−1), or edits (*). The current version (or "current resource state") of the transaction history 18 is the total number of operations stored in the transaction list 20. Accordingly, as each change resource operation for the user list resource is received by the server software 16 from a participant in the real time collaboration session, an entry is added to the transaction list 20, and the version of the transaction history 18 is incremented.

In the specific example of FIG. 1, the resource change operations stored in the transaction list 20 consist of add user operations that are appended to the transaction list 20 as corresponding participants join the real time collaboration session, shown for purposes of illustration as "+" operations, and remove user operations that are appended to the transaction list 20 as corresponding participants leave the session, shown for purposes of illustration as "−" operations. The operations stored in the transaction list 20 are accordingly stored in the order they are received by the real-time collaboration server software 16. The resource change operations stored in the transaction history 18 further include values specifically indicating the user being added or removed by each operation. Accordingly, the first operation in the transaction history 18 is "+user1", which is an add user operation that added "user1" to the list of users for the real time collaboration session when "user1" joined the session. The second operation in the transaction history 18 is another add user operation ("+user2") that added "user2" to the list of users when "user2" subsequently joined. A third operation similarly added "user3", and a fourth operation removed "user2", for example when "user2" later terminated or otherwise exited the session. The fifth through seventh entries in the transaction list 20 were added at the times when user4, user5 and user6 joined the real time collaboration session, and the eighth entry was added when user 3 exited the session.

During operation of the embodiment shown in FIG. 1, at a Time 1 22, the local user for the polling end point 1 10 joins the real time collaboration session, and sends a join session message to the real time collaboration server software 16. The join session message is one type of session update request message, and allows for authentication and/ or other features to be used at the time a user joins a session. In response to the join session message issued at Time 1 22, a last session state for the polling end point 1 10 is obtained in order to process the join session message. In one embodiment, the last session state for the polling end point 1 10 is provided within the join session message passed from the polling end point 1 10 to the server computer system 14. Alternatively, the real-time collaboration server software 16 looks up a last session state associated with the polling end point 1 10 upon receipt of the join session message from the polling end point 1. In the example of FIG. 1, the last session state is shown as "version:0", passed from the polling end point 1 10, and indicating that the version of the user list resource currently understood by the real time client software 11 is 0.

Further at Time 1 22, when the join session message is received by the real time collaboration server software 16, the real time collaboration server software 16 determines that only one operation is currently stored in the transaction list 20 for the user list resource. That one entry is shown as the operation +user1, indicating that "user1" has joined the session. Accordingly, with regard to the user list resource, the real time collaboration server software 16 responds to the real time collaboration client software 11 with a message including the resource change operation "add:user1". The resource change operation "add:user1" indicates that "user1" should be added to the participant list in the representation of the real time collaboration session maintained by the real time collaboration client software on the polling end point 1 10. Accordingly, after the real time collaboration client software 11 adds "user 1" to its representation of the real time collaboration session, the local user of polling end point 1 10 is presented with a screen name or the like for "user1" in the visually displayed participant list for the real time collaboration session in the graphical user interface of polling end point 1 10.

Also generated by the real-time collaboration server software 16 at Time 1 22 in response to the join request message from polling end point 1 10 is an updated last session state for polling end point 1 10. In the example of FIG. 1, the updated last session state generated at Time 1 22 is shown by "version:1", indicating that at the last time polling end point 1 10 was updated, the version of the transaction list 20 (and accordingly of the user list resource represented by transaction history 18) was 1. The value 1 indicates polling end point 1 10 has been updated with regard to resource change operations performed by participants in the real time collaboration session on the list of session participants up through the operation represented by the first entry in the transaction list 20.

In order to maintain its local representation of the real time collaboration session in synchronization with the other participant client computer systems, the polling end point 1 10 periodically issues session update request messages to the real-time collaboration server software 16. For example, as shown in FIG. 1, at Time 2 24, the real time collaboration client software 11 sends a session update request message to the real time collaboration server software 16. In one embodiment, the session update request message sent at Time 2 24 includes the last session state for polling end point 1 10, shown in FIG. 1 by "version:1". Alternatively, the real-time collaboration server software looks up a copy of the last session state for polling end point 1 10 stored on the server computer system 14. In either case, the real-time collaboration server software 16 processes the session update request received at Time 2 24 from the polling end point 1 10 by comparing the last session state for polling end point 1 10 with the current session state maintained by the real time collaboration server software 16. In the example of FIG. 1, the current session state for the list of users transaction history 18 at Time 2 24 is 4, since entries 2, 3 and 4 have been added to the transaction list 20. The real time collaboration server software 16 compares the last session state for the end point 1 10 of 1 with the current session state for the transaction history 18 of 4, and determines that the resource change operations represented by entries 2 through 4 of the transaction list 20 have been performed since the polling end point 1 10 was last updated. The real time collaboration server software 16 then examines the operations represented in entries 2 through 4 to determine whether those entries represent any operations that negate each other. In the example of FIG. 1, entry 2 represents an operation that adds "user2" ("+user2"), while entry 4 represents an operation that removes "user2" ("−user2"). Accordingly, the real time collaboration server software 16 determines that the operations represented by entry 2 and entry 4 of the transaction list 20 negate each other. The real time collaboration server software 16 therefore omits the operations represented by entries 2 and 4 from the set of resource change operations provided by the real time collaboration server software 16 to the polling end point 1 10 in response to the session update request message received at Time 2 24. As a result, the response provided from the real time collaboration server software 16 at Time 2 24 includes only the operation adding "user3" to the participant list to the polling end point 1 10, shown for purposes of illustration in FIG. 1 as "add:user3". Then, for example, the local user of polling end point 1 10 is presented with a screen name or the like for "user3" in the visually displayed participant list for the real time collaboration session in the graphical user interface of polling end point 1 10.

A new last session state for polling end point 1 10 is then generated by the real-time collaboration server software 16, having a value of 4 for the transaction history 18, since the polling end point 1 10 has been updated through entry 4 of the transaction list 20. The new last session state for polling end point 1 10 may either be provided to the polling end point 1 10 (as shown for purposes of illustration in the example of FIG. 1 by "version:4"), or stored locally in server system 14.

Further during operation of the embodiment shown in FIG. 1, at a Time 3 26, the local user for the polling end point 2 12 joins the real time collaboration session, and sends a join session message to the real time collaboration server software 16. In response to the join session message issued at Time 3 26, a last session state for the polling end point 2 12 is obtained in order to process the join session message. In the example of FIG. 1, the last session state is shown as "version:0", passed from the polling end point 2 12, and indicating that the version of the user list resource currently understood by the real time client software 13 is 0.

Further at Time 3 26, when the join session message is received by the real time collaboration server software 16, the real time collaboration server software 16 determines that five operations are currently stored in the transaction list 20 for the user list resource. Accordingly, with regard to the user list resource, the real time collaboration server software 16 responds to the real time collaboration client software 13 with a message including the resource change operations "add:user1, 3, 4". The resource change operations "add:user1, 3, 4" indicate that "user1", "user3", and "user4" should be added to the participant list in the representation of the real time collaboration session maintained by the real time collaboration client software on the polling end point 2 12. As noted above, the real time collaboration server software 16 does not include the resource change operations for entries 2 and 4 of the transaction list 20, since those two operations negate each other. Accordingly, after the real time collaboration client software 13 adds "user1", "user3" and "user4" to its representation of the real time collaboration session, the local user of polling end point 2 12 may be presented with screen names or the like for "user1", "user3"

and "user4" in the visually displayed participant list for the real time collaboration session in the graphical user interface of polling end point 2 12.

Also generated by the real-time collaboration server software 16 at Time 3 26 in response to the join request message from polling end point 2 12 is an updated last session state for polling end point 2 12. In the example of FIG. 1, the updated last session state generated at Time 3 26 is shown by "version:5", indicating that at the last time polling end point 2 12 was updated, the version of the transaction list 20 (and accordingly of the user list resource represented by transaction history 18) was 5. The value 5 indicates polling end point 2 12 has been updated with regard to resource change operations performed by session participants in the real time collaboration session on the list of session participants resource up through the operation represented by the fifth entry in the transaction list 20.

Like polling end point 1 10, the polling end point 2 12 periodically issues session update request messages to the real-time collaboration server software 16. For example, as shown in FIG. 1, at Time 4 28, the real time collaboration client software 13 sends a session update request message to the real time collaboration server software 16. In one embodiment, the session update request message sent at Time 4 28 includes the last session state for polling end point 2 12, shown in FIG. 1 by "version:5". Alternatively, the real-time collaboration server software 16 looks up a copy of the last session state for polling end point 2 12 stored on the server computer system 14. In either case, the real-time collaboration server software 16 processes the session update request received at Time 4 28 from the polling end point 2 12 by comparing the last session state for polling end point 2 12 with the current session state maintained by the real time collaboration server software 16. In the example of FIG. 1, the current session state for the list of users transaction history 18 at Time 4 28 is 8, since entries 6, 7 and 8 have also been added to the transaction list 20. The real time collaboration server software 16 compares the last session state for the end point 2 12 of 5 with the current session state for the transaction history 18 of 8, and determines that the resource change operations represented by entries 6 through 8 of the transaction list 20 have been performed since the polling end point 2 12 was last updated. The real time collaboration server software 16 then examines the operations represented in entries 6 through 8 to determine whether those entries represent any operations that negate each other. In the example of FIG. 1, the response provided from the real time collaboration server software 16 at Time 4 28 includes the operations adding "user5" and "user6" to the participant list, shown for purposes of illustration in FIG. 1 as "add:user5, 6", and the operation removing "user3", shown for purposes of illustration as "remove: user3". Then, for example, the local user of polling end point 2 12 is presented with screen names or the like for "user5" and "user6", but no longer for "user3", in the visually displayed participant list for the real time collaboration session in the graphical user interface of polling end point 2 12.

A new last session state for polling end point 2 12 is then generated by the real-time collaboration server software 16, having a value of 8 for the transaction history 18, since the polling end point 2 12 has been updated through entry 8 of the transaction list 20. The new last session state for polling end point 2 12 may either be provided to the polling end point 2 12 (as shown for purposes of illustration in the example of FIG. 1 by "version:8"), or stored locally in server system 14.

The polling end point 1 10, polling end point 2 12 and server computer system 14 may be communicably connected using any specific kind of data communication network and/or protocol. The polling end point 1 10, polling end point 2 12, and server computer system 14 each include at least one processor, program storage, such as memory and/or another computer readable medium, for storing program code (e.g. the real time collaboration client software 11, real time collaboration client software 13 and real time collaboration server software 16) executable on the processor, and for storing data operated on by such program code (e.g. the transaction history 18). The polling end point 1 10, polling end point 2 12, and server computer system 14 each further include one or more input/output devices and/or interfaces, such as data communication and/or peripheral devices and/or interfaces, and may each further include appropriate operating system software.

Figure 2:
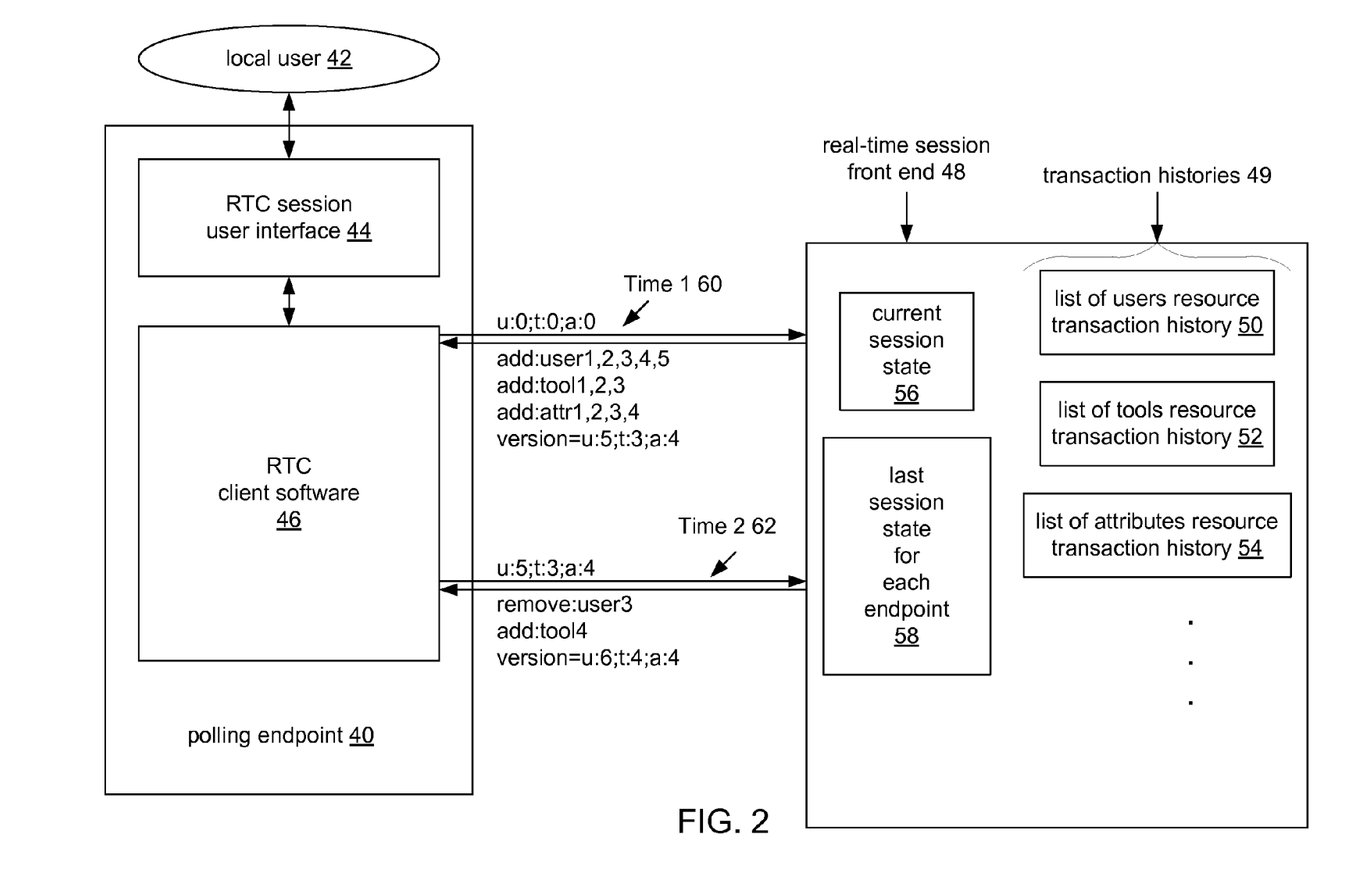
FIG. 2 is another block diagram further showing structure and operation of an illustrative embodiment of the disclosed system.

FIG. 2 is a block diagram further showing structure and operation of an illustrative embodiment of the disclosed system. As shown in FIG. 2, a polling end point 40 (e.g. client computer system or other client device) includes real time collaboration client software, shown as real time collaboration client software 46. An example of at least a portion of the disclosed real-time collaboration server software 16 of FIG. 1 is shown by the real-time session front end 48 in FIG. 2. The real-time session front end 48 is uniquely associated with a corresponding real time collaboration session among a plurality of session participants including the local user 42. The local user 42 participates in the real time collaboration session corresponding to real time session front end 48 through the real time collaboration session user interface 44 provided by the real time collaboration client software 46.

The real time session front end 48 includes a plurality of transaction histories 49, each of which represents a resource shared during the real time collaboration session. For example, the transaction histories 49 are shown including a list of users resource transaction history 50 storing resource change operations performed on a shared list of session participants, a list of tools resource transaction history 52 storing resource change operations performed on a shared list of tools, and a list of attributes resource transaction history 54 storing resource change operations performed on a shared list of attributes.

In the case where the real time collaboration session is a group instant messaging session, the shared list of session participants might be the list of users currently participating in the session, and the shared list of attributes might represent the current on-line status of a set of users.

Examples of tools that may be present in a shared list of tools for a real time collaboration session include interactive on-line discussions (i.e. chatrooms), whiteboards, and/or data conferencing tools (i.e. application sharing and/or document sharing). Attributes in a shared list of attributes can include meeting-based attributes (e.g. indicating a current tool that is active in a projector area or the like in a session), and/or user specific attributes, such as an attribute for a given user indicating that the user has virtually raised their hand in an online meeting (e.g. by an attribute "handraise" for that user being set to 'true').

The polling end point 40 provides the real-time collaboration session to the local user 42, for example by way of the real time collaboration session user interface 44, within a graphical user interface or the like on the polling end point 40. The graphical user interface containing the real time collaboration session user interface 44 may be any specific type of interactive user interface, navigated using any specific type of user interface device provided as part of the polling end point 40, such as a computer keyboard or mouse, and/or using voice commands or the like.

During operation of the embodiment shown in FIG. 2, at a Time 1 60, the local user 42 for the polling end point 40 joins the real time collaboration session, and as a result a join session message is sent by the real time collaboration client software 46 to the real time session front end 48. In response to the join session message issued at Time 1 60, a last session state for the polling end point 40 is obtained in order to process the join session message. In one embodiment, the last session state for the polling end point 1 10 is provided within the join session message passed from the polling end point 1 10 to the server computer system 14. Alternatively, the real-time session front end 48 looks up a last session state associated with the polling end point 40 in the last session state for each end point database 58 upon receipt of the join session message from the polling end point 40. In the example of FIG. 2, the last session state is shown as "u:0;t:0;a:0", passed from the polling end point 40, and indicating that the versions of the list of users, list of tools, and list of attributes resources currently understood by the real time client software 46 are all 0.

Further at Time 1 60, when the join session message is received by the real time collaboration server software 16, by comparing the last session state with the current session state 56, the real time session front end 48 determines that 5 resource change operations has been performed on the list of users resource (e.g. represented by entries containing "+user1", "+user2", "+user3", "+user4", and "+user5" in the transaction history 50), 3 operations have been performed on the list of tool resource (e.g. represented by entries containing "+tool1", "+tool2", and "+tool3" in the transaction history 52), and 4 operations have been performed on the list of attributes resource (e.g. represented by entries containing "+attr1", "+attr2", "+attr3", and "+attr4" in the transaction history 54). Accordingly, with regard to the list of users resource, the real time session front end 48 responds to the real time collaboration client software 46 with a message including indication of resource change operations consisting of "add:user1, 2, 3, 4, 5", "add:tool1, 2, 3", and "add: attr1, 2, 3, 4". For example, "add:user1, 2, 3, 4, 5" indicates that "user1", "user2", "user3" and "user3" are to be added to the copy of the client software 46's list of users for the session, "add:tool1, 2, 3" indicates that "tool1", "tool2" and "tool3" are to be added to the copy of the client software 46's tools for the session, and "add:attr1, 2, 3, 4" indicates that "attr1", "attr2", "attr3" and "attr4" are to be added to the attributes the client software 46's attributes for the session. Accordingly, after the real time collaboration client software 46 adds "user1", "user2", "user3" and "user3", "tool1", "tool2" and "tool3", and "attr1", "attr2", "attr3" and "attr4" to its representation of the real time collaboration session, the local user 42 presented with screen names or the like for "user1", "user2", "user3", collaboration tools corresponding to "tool1", "tool2" and "tool3", and attributes corresponding to "attr1", "attr2", "attr3" and "attr4" in the real time collaboration session user interface 44.

Also generated by the real-time session front end 48 at Time 1 60 in response to the join request message from polling end point 40 is an updated last session state for polling end point 40. In the example of FIG. 2, the updated last session state generated at Time 1 60 is shown by "version=u:5;t:3;a:4", indicating that at the last time polling end point 40 was updated, the version of the transaction histories 50, 52 and 54 were 5, 3 and 2, respectively.

The polling end point 40 periodically issues session update request messages to the real time session front end 48. For example, as shown in FIG. 2, at Time 2 62, the real time collaboration client software 46 sends a session update request message to the real time session front end 48. In one embodiment, the session update request message sent at Time 2 62 includes the last session state for polling end point 40, shown in FIG. 2 by "u:5;t:3;a:4". Alternatively, the real-time session front end 48 looks up a copy of the last session state for polling end point 40 in the database 58. In either case, the real-time session front end 48 processes the session update request received at Time 2 62 from the polling end point 40 by comparing the last session state for polling end point 40 with the current session state 56 maintained by the real time session front end 48. In the example of FIG. 2, determines that operations removing "user3" and adding "tool4" have been performed since the polling end point 40 was last updated. The real time session front end 48 therefore responds at Time 2 62 with indications of those two operations, shown in FIG. 2 by "remove:user3" and "add:tool4". The real time session front end 48 further operates to store a new last client session state indicating that polling end point 40 has been updated through the sixth resource change operation on the list of users, through the fourth resource change operation on the list of tools, and through the fourth resource change operation on the list of attributes, shown in FIG. 2 as "version=u:6;t:4;a4".

Figure 3:
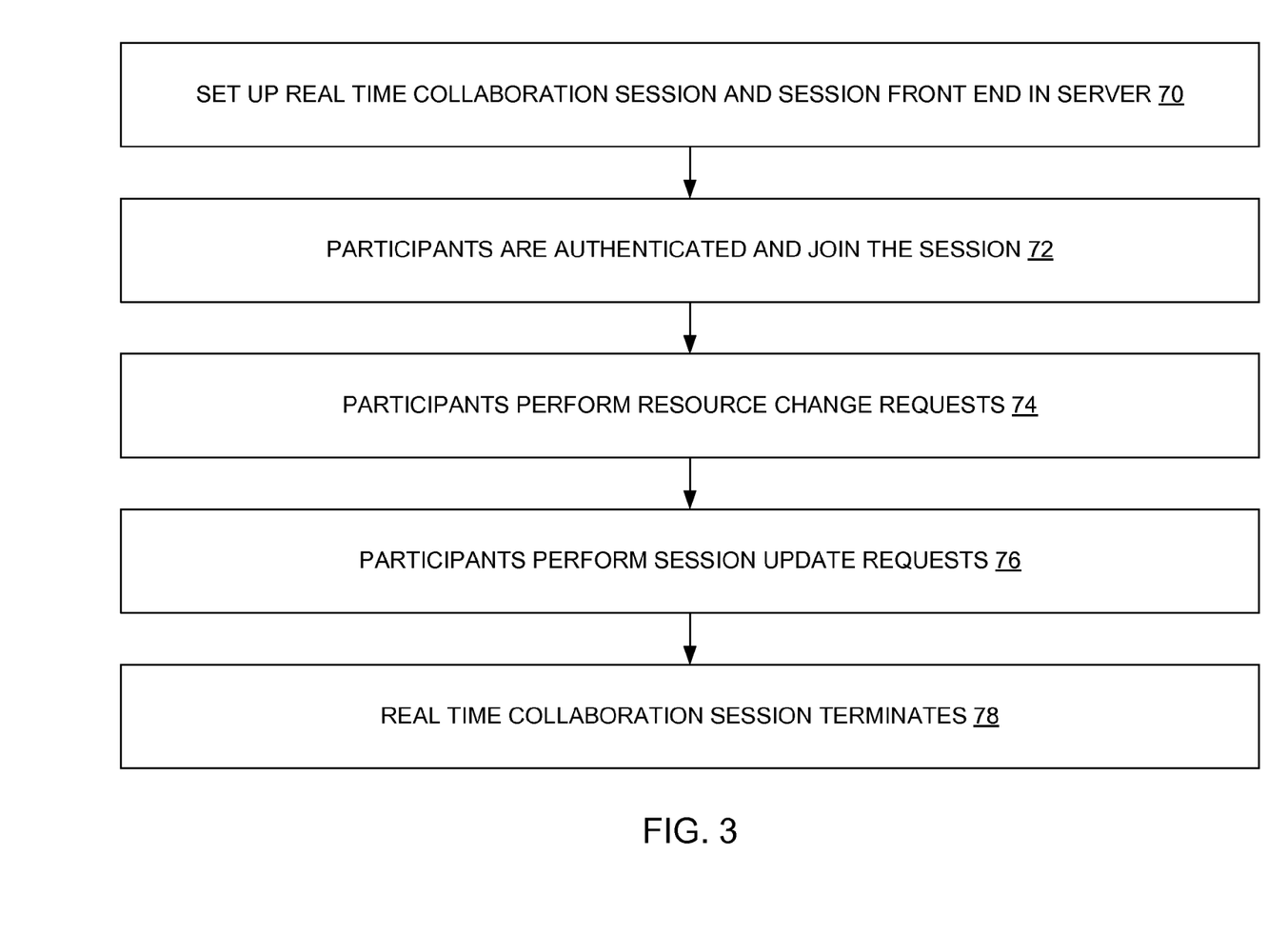
FIG. 3 is a flow chart showing steps performed by an illustrative embodiment of the disclosed system.

FIG. 3 is a flow chart showing steps performed by an illustrative embodiment of the disclosed system. At step 70, the disclosed system sets up a real time collaboration session, including a real time session front end on a server system, such as shown by the real time session front in 48 of FIG. 2. The real time collaboration session set up at step 70 may be any specific kind of real time collaboration session, such as, for example, a Web conference, on-line meeting, group instant messaging session, and the like, in which a number of participants collaborate in real time over a data communication network through execution of software application program code.

A unique session identifier is defined at step 70 to uniquely identify the session. This allows the server to host several real-time sessions, simultaneously. For example, any number of distinct on-line meetings, instant messaging and presence sessions may co-exist on the same server without interference.

At step 72, a number of participants join the session, and are authenticated as needed. As each participant joins the session, they are provided with the current version of the session at the time they join. In this way, the join operations represented by step 72 are similar in operation to the session update operations described with regard to step 76 below.

At step 74, the disclosed system operates such that session participants perform resource change operations on resources shared in the session. An end point that wants to make a resource change request does so by using the respective HTTP command—HTTP PUT for resource additions, HTTP DELETE for resource deletions, or HTTP POST for resource edits, followed by a resource identifying pointer (e.g. a URL). For example, if a local user of an end point desires to remove a tool from the real time collaboration session, the resulting command and the URL sent in the command from the end point to the server has the following format:

DELETE http://<server-name>/<context-root>/<session-id>/tool.

The DELETE operation indicates that a tool is to be removed, the /<session-id> in the URL is the unique identifier for the real time session, and the /tool in the URL is a resource name uniquely identifying within the session the target resource on which the operation is to be performed. The server software maintains a list for each resource in the collaboration session containing the resource change operations performed on that resource during the session.

At step 76, each end point in the session polls for session updates using HTTP GET operations and resource-based pointers (e.g. URLs). For example, a session update request has the following format:

GET http://<server-name>/<context-root>/<session-id>. where the /<session-id> in the URL is the unique identifier for the real time session. In response to receipt of an update request operation, the disclosed server system software determines which operations on which resources in the session need to be provided to the requesting end point, also eliminating negating operations. The server software then returns a sequential set of operations and data from the transaction histories it maintains for the resources in the session.

While steps 74 and 76 are shown for purposes of illustration as being in order in FIG. 3, those skilled in the art will recognize that those steps occur in parallel across the participants of the real time session, such that updates and changes may occur in any order. Accordingly, while some participants are performing resource change requests, others may be performing session update requests.

At step 78, the real time collaboration session terminates, for example as a result of the participants logging off or otherwise exiting the session.

The disclosed system provides many potential advantages. First, it relatively simple to implement on client systems. The use in the disclosed system of pure HTTP, as opposed to HTTP tunneling of messages, avoids proprietary messages, parsing, and/or non-HTTP semantics. Therefore, the disclosed system can be implemented in the client using JavaScript on the Web browser, thus avoiding the need to download additional code to the Web browser.

In addition, optimal server implementations are possible. The disclosed resource oriented approach is a natural fit for a standard Web Application Server (e.g. J2EE, .net, etc.) Most of the common and pre-existing services may be leveraged in this regard, thus removing the need to duplicate such services in proprietary code. Examples of such services include: authentication, encryption, authorization, load-balancing, session timeout detection, caching, etc. Furthermore, the disclosed system requires very little per-user state in the server, other than the versioning mechanism based on current session state and last client states, which can be provided using strings or small arrays of numbers.

The responses provided by the disclosed system to update requests are also optimized. The disclosed system is able to return only the minimum incremental updates needed to synchronize an end point. This is done on a per-end point basis, and can adapt to end points polling at different frequencies.

The disclosed system further provides relatively simple connectivity, does not require defense mechanisms, and has no immediate concerns with queued messages or timed-out users. After a real disconnect, if the client system eventually tries again, it will either receive an optimized response, or it will receive a full refresh of the session state. It should be noted that a true client system disconnect is relatively simple to detect on a standard application server, and in this case, the user representation can be removed from the server data structures, and connected clients see that the user has left.

The disclosed system is significantly "future proof". This falls from the fact that the client-side technology of the disclosed system leverages built-in browser services, and that the server-side technology leverages Web-App services. Therefore, an implementation of this solution is not burdened with adapting to newer versions of HTTP, IPv6, SIP, etc. For example, as more end point devices accept gzip compressed HTTP, this sort of client-side capability comes for free.

The disclosed system is relatively simple to understand and inspect. Each operation along with the accompanying canonical URI clearly identifies the operation that needs to be performed on the identified data structure, leaving no room for ambiguity. This lowers the barriers and costs associated with trouble shooting, and maintenance. It also acts as a sort of API, thus simplifying the task of creating language agnostic bindings, as well as general integration.

The disclosed system is also simple to integrate with any back-end system. Back-end technology can easily adapt to other systems on the user's behalf. For example, the server might adapt to a given system, and likewise change the virtual data structure as events for that system are detected. For example, an similar adapter could connect to a SIP or XMPP-based server.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method embodied in at least one computer for providing a Web-based real-time collaboration application, comprising:

providing, by said at least one computer, a session front end on a server system, said session front end including a plurality of separate transaction histories for corresponding ones of a plurality of resources shared among a plurality of client systems during a real-time collaboration session, wherein each one of said transaction histories includes all resource change request operations received for a corresponding one of said plurality of resources from said client systems up to a current point in time during said real-time collaboration session, wherein each of said resource change request operations includes a hierarchical pointer including both i) a session identifier uniquely identifying said real-time collaboration session, and ii) resource identifier uniquely identifying one of said resources to which said resource change request operation is directed, and wherein said pointer comprises a Uniform Resource Locator (URL), and wherein said session front end further includes a current session state maintained across all said plurality of resources, wherein said current session state indicates respective numbers of said resource change request operations received from said client systems for each individual one of said resources up to said current point in time during said real-time collaboration session;

receiving, by said session front end during said real-time collaboration session, a session update request operation from one of said client systems;

processing said received session update request operation in said session front end by comparing said current session state with a last session state associated with said one of said client systems from which said session update request operation was received, wherein said last session state associated with said one of said client systems from which said session update request operation was received indicates individual numbers of change request operations said client system from which said update request operation was received has previously received from the session front end for each of said plurality of session resources;

receiving, by said session front end, a join session message from a second one of said client systems, wherein said join session message includes a last session state associated with said second one of said client systems, wherein said last session state associated with said second one of said client systems indicates a version of a user list resource currently understood by the second one of said client systems; and processing said received join session message in said session front end by i) identifying, responsive to said last session state included in said join message, an add user resource change request operation that has not yet been forwarded to said second one of said client systems, and ii) forwarding said add user resource change request operation from said server system to said second one of said client systems to cause said second one of said client system to display, within a participant list for the real time collaboration session contained in a user interface of said second one of said client systems, a user name of a user added to said user list resource by said identified add user resource change request.

2. The method of claim 1, wherein each of said resource change request operations comprises one of the set consisting of an HTTP PUT command, an HTTP POST command, and an HTTP DELETE command.

3. The method of claim 1, further comprising:

responsive to said comparing said current session state with said last session state associated with said one of said client systems from which said session update request operation was received, determining, for each of said plurality of session resources, at least one resource change request operation that has not yet been forwarded to said client system from which said session update request operation was received; and forwarding said least one resource change request operation that has not yet been forwarded to said client system from which said session update request operation was received to bring it up to date with regard to said real-time collaboration session.

4. The method of claim 3, further comprising:

wherein said at least one resource change request operation that has not yet been forwarded to said client system from which said session update request operation was received comprises a plurality of resource change request operations; and prior to said forwarding said plurality of resource change request operations that have not yet been forwarded to said client system from which said session update request operation was received, identifying and removing at least two negating resource change operations from said plurality of resource change request operations that have not yet been forwarded to said client system from which said session update request operation was received.

5. The method of claim 3, further comprising updating said last session state associated with said one of said client systems from which said session update request operation was received to reflect those resource change request operations forwarded to said one of said client systems from which said session update request operation was received.

6. The method of claim 3, wherein said session update request operation comprises an HTTP GET command.

7. The method of claim 3, wherein said plurality of transaction histories include no session update request operations.

8. The method of claim 5, wherein said last session state for said one of said client systems from which said session update request operation was received is stored in said session front end.

9. The method of claim 5 wherein said last session state for said one of said client systems from which said session update request operation was received is stored in said one of said client systems and is contained in said session update request operation.

10. A system including at least one processor and a computer readable memory, said computer readable memory having stored thereon program code for, when executed on said processor, providing a Web-based real-time collaboration application, said program code comprising:

program code for providing a session front end on a server system, said session front end including a plurality of separate transaction histories for corresponding ones of a plurality of resources shared among a plurality of client systems during a real-time collaboration session, wherein each one of said transaction histories includes all resource change request operations received for a corresponding one of said plurality of resources from said client systems up to a current point in time during said real-time collaboration session, wherein each of said resource change request operations includes a hierarchical pointer including both i) a session identifier uniquely identifying said real-time collaboration session, and ii) resource identifier uniquely identifying one of said resources to which said resource change request operation is directed, and wherein said pointer comprises a Uniform Resource Locator (URL), and wherein said session front end further includes a current session state maintained across all said plurality of resources, wherein said current session state indicates respective numbers of said resource change request operations received from said client systems for each individual one of said resources up to said current point in time during said real-time collaboration session;

program code for receiving, by said session front end during said real-time collaboration session, a session update request operation from one of said client systems;

program code for processing said received session update request operation in said session front end by comparing said current session state with a last session state associated with said one of said client systems from which said session update request operation was received, wherein said last session state associated with said one of said client systems from which said session update request operation was received indicates individual numbers of change request operations said client system from which said update request operation was received has previously received from the session front end for each of said plurality of session resources;

program code for receiving, by said session front end, a join session message from a second one of said client systems, wherein said join session message includes a last session state associated with said second one of said client systems, wherein said last session state associated with said second one of said client systems indicates a version of a user list resource currently understood by the second one of said client systems; and program code for processing said received join session message in said session front end by i) identifying, responsive to said last session state included in said join message, an add user resource change request operation that has not yet been forwarded to said second one of said client systems, and ii) forwarding said add user resource change request operation from said server system to said second one of said client systems to cause said second one of said client system to display, within a participant list for the real time collaboration session contained in a user interface of said second one of said client systems, a user name of a user added to said user list resource by said identified add user resource change request.

11. The system of claim 10, further comprising:
wherein each of said resource change request operations comprises one of the set consisting of an HTTP PUT command, an HTTP POST command, and an HTTP DELETE command.

12. The system of claim 10, said program code further comprising:
program code for, responsive to said comparing said current session state with said last session state associated with said one of said client systems from which said session update request operation was received, determining, for each of said plurality of session resources, at least one resource change request operation that has not yet been forwarded to said client system from which said session update request operation was received;

program code for forwarding said least one resource change request operation that has not yet been forwarded to said client system from which said session update request operation was received to bring it up to date with regard to said real-time collaboration session;

wherein said at least one resource change request operation that has not yet been forwarded to said client system from which said session update request operation was received comprises a plurality of resource change request operations; and program code for, prior to said forwarding said plurality of resource change request operations that have not yet been forwarded to said client system from which said session update request operation was received, identifying and removing at least two negating resource change operations from said plurality of resource change request operations that have not yet been forwarded to said client system from which said session update request operation was received.

13. The system of claim 12, said program code further comprising:
program code for updating said last session state associated with said one of said client systems from which said session update request operation was received to reflect those resource change request operations forwarded to said one of said client systems from which said session update request operation was received;

wherein said session update request operation comprises an HTTP GET command; and wherein said plurality of transaction histories include no session update request operations.

14. The system of claim 12, wherein said last session state for said one of said client systems from which said session update request operation was received is stored in said session front end.

15. The system of claim 12, wherein said last session state for said one of said client systems from which said session update request operation was received is stored in said one of said client systems and is contained in said session update request operation.

16. A computer program product including a non-signal computer readable storage medium, said computer readable storage medium having stored thereon program code for providing a Web-based real-time collaboration application, said program code comprising:
program code for providing a session front end on a server system, said session front end including a plurality of separate transaction histories for corresponding ones of a plurality of resources shared among a plurality of client systems during a real-time collaboration session, wherein each one of said transaction histories includes all resource change request operations received for said a corresponding one of said plurality of resources from said client systems up to a current point in time during said real-time collaboration session, wherein each of said resource change request operations includes a hierarchical pointer including both i) a session identifier uniquely identifying said real-time collaboration session, and ii) resource identifier uniquely identifying one of said resources to which said resource change request operation is directed, and wherein said pointer comprises a Uniform Resource Locator (URL), and wherein said session front end further includes a current session state maintained across all said plurality of resources, wherein said current session state indicates respective numbers of said resource change request operations received from said client systems for each individual one of said resources up to said current point in time during said real-time collaboration session;

program code for receiving, by said session front end during said real-time collaboration session, a session update request operation from one of said client systems;

program code for processing said received session update request operation in said session front end by comparing said current session state with a last session state associated with said one of said client systems from which said session update request operation was received, wherein said last session state associated with said one of said client systems from which said session update request operation was received indicates individual numbers of change request operations said client system from which said update request operation was received has previously received from the session front end for each of said plurality of session resources;

program code for receiving, by said session front end, a join session message from a second one of said client systems, wherein said join session message includes a last session state associated with said second one of said client systems, wherein said last session state associated with said second one of said client systems indicates a version of a user list resource currently understood by the second one of said client systems; and program code for processing said received join session message in said session front end by i) identifying, responsive to said last session state included in said join message, an add user resource change request operation that has not yet been forwarded to said second one of said client systems, and ii) forwarding said add user resource change request operation from said server system to said second one of said client systems to cause said second one of said client system to display, within a participant list for the real time collaboration session contained in a user interface of said second one of said client systems, a user name of a user added to said user list resource by said identified add user resource change request.

* * * * *